United States Patent
Patel et al.

(10) Patent No.: US 10,118,582 B2
(45) Date of Patent: Nov. 6, 2018

(54) RESTRAINT SYSTEM

(71) Applicant: Ford Global Technologies, LLC, Dearborn, MI (US)

(72) Inventors: Deepak Patel, Canton, MI (US); Zhibing Deng, Northville, MI (US); Luis Enrique Castillo Jaime, Distrito Federal (MX); Nand K. Kochhar, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/382,886

(22) Filed: Dec. 19, 2016

(65) Prior Publication Data
US 2018/0170300 A1    Jun. 21, 2018

(51) Int. Cl.
| | |
|---|---|
| *B60R 21/232* | (2011.01) |
| *B60R 21/0136* | (2006.01) |
| *B60R 21/231* | (2011.01) |
| *B60R 21/2338* | (2011.01) |
| *B60R 21/239* | (2006.01) |
| *B60R 21/262* | (2011.01) |

(Continued)

(52) U.S. Cl.
CPC ........ *B60R 21/232* (2013.01); *B60R 21/0136* (2013.01); *B60R 21/239* (2013.01); *B60R 21/2338* (2013.01); *B60R 21/23138* (2013.01); *B60R 21/262* (2013.01); *B60R 21/264* (2013.01); *B60R 2021/0006* (2013.01); *B60R 2021/0048* (2013.01); *B60R 2021/01013* (2013.01); *B60R 2021/01054* (2013.01); *B60R 2021/01088* (2013.01); *B60R 2021/01211* (2013.01); *B60R 2021/01286* (2013.01); *B60R 2021/2395* (2013.01); *B60R 2021/23514* (2013.01); *B60R 2021/23542* (2013.01)

(58) Field of Classification Search
CPC .... B60R 21/232; B60R 21/262; B60R 21/263
See application file for complete search history.

(56) References Cited

U.S. PATENT DOCUMENTS

| | | | |
|---|---|---|---|
| 6,612,611 B1 * | 9/2003 | Swann | B60R 21/21 280/729 |
| 6,820,898 B2 * | 11/2004 | Dinsdale | B60R 21/232 137/68.13 |

(Continued)

FOREIGN PATENT DOCUMENTS

| | | |
|---|---|---|
| DE | 102006047104 A1 | 4/2008 |
| JP | 5983574 B2 * | 8/2016 |
| WO | WO 2016010233 A1 | 1/2016 |

OTHER PUBLICATIONS

UK Search Report dated Jun. 14, 2018 re Application No. GB1721200.2.

*Primary Examiner* — Nicole T Verley
(74) *Attorney, Agent, or Firm* — Frank A. MacKenzie; Bejin Bieneman PLC (57) ABSTRACT

A restraint system includes a side air curtain, a sail panel, and a secondary cushion. The side air curtain is inflatable to an inflated position and has a top edge, a bottom edge, and a forward edge extending from the top edge to the bottom edge. The sail panel extends from the forward edge. The secondary cushion is inflatable to an inflated position and is elongated in a direction away from the bottom edge and the forward edge toward the top edge.

20 Claims, 9 Drawing Sheets

(51) Int. Cl.
*B60R 21/264* (2006.01)
*B60R 21/00* (2006.01)
*B60R 21/01* (2006.01)
*B60R 21/235* (2006.01)

(56) References Cited

U.S. PATENT DOCUMENTS

| | | | |
|---|---|---|---|
| 6,851,706 B2 | 2/2005 | Roberts et al. | |
| 7,048,301 B2* | 5/2006 | Walsh | B60R 21/23184 |
| | | | 280/730.2 |
| 8,020,888 B2* | 9/2011 | Cheal | B60R 21/213 |
| | | | 280/729 |
| 8,408,591 B2 | 4/2013 | Walston | |
| 8,414,021 B2 | 4/2013 | Tanaka et al. | |
| 8,573,639 B1 | 11/2013 | Markusic et al. | |
| 8,720,941 B1* | 5/2014 | Svensson | B60R 21/233 |
| | | | 280/730.2 |
| 8,807,595 B2 | 8/2014 | Nakamura et al. | |
| 8,851,510 B1* | 10/2014 | Dinsdale | B60R 21/23138 |
| | | | 280/730.2 |
| 8,882,139 B2* | 11/2014 | Kawamura | B60R 21/213 |
| | | | 280/730.2 |
| 8,967,660 B2* | 3/2015 | Taguchi | B60R 21/233 |
| | | | 280/729 |
| 9,022,420 B1 | 5/2015 | Arellano | |
| 9,108,588 B2* | 8/2015 | Fukawatase | B60R 21/233 |
| 9,126,558 B2* | 9/2015 | Kawamura | B60R 21/213 |
| 9,139,154 B2* | 9/2015 | Abramoski | B60R 21/232 |
| 9,440,610 B2* | 9/2016 | Lee | B60R 21/232 |
| 9,469,269 B2* | 10/2016 | Hiruta | B60R 21/232 |
| 2007/0052212 A1 | 3/2007 | Powals | |
| 2014/0203541 A1 | 7/2014 | Wei et al. | |
| 2014/0217709 A1* | 8/2014 | Fukawatase | B60R 21/232 |
| | | | 280/730.2 |
| 2014/0217710 A1* | 8/2014 | Fukawatase | B60R 21/233 |
| | | | 280/730.2 |
| 2014/0239620 A1* | 8/2014 | Kawamura | B60R 21/213 |
| | | | 280/730.2 |
| 2015/0115581 A1* | 4/2015 | Mazanek | B60R 21/232 |
| | | | 280/730.2 |
| 2016/0023626 A1 | 1/2016 | Hiruta et al. | |
| 2016/0107600 A1* | 4/2016 | Lee | B60R 21/232 |
| | | | 280/729 |
| 2017/0182967 A1* | 6/2017 | Suzuki | B60R 21/213 |

* cited by examiner

FIG. 9

RESTRAINT SYSTEM

BACKGROUND

Motor vehicles, such as automobiles, may include airbags designed to be inflated and to be impacted by occupants during a side or frontal oblique impact of the vehicle. For example, a side air curtain may deploy downwardly from a roof rail alongside windows during a side collision, and the side air curtain may be impacted by an occupant adjacent to the side air curtain.

Vehicles may be subject to impact testing standards for the curtain airbags. As one example, the National Highway Traffic Safety Administration (NHTSA) provides a test procedure designed to simulate a vehicle experiencing a side collision with a pole. The NHTSA procedure provides that a test vehicle holding a test dummy as an occupant collides sideways at 20 miles per hour into a rigid vertical pole 10 inches in diameter. As another example, NHTSA provides a test procedure to measure "ejection," that is, an occupant intruding through a window opening. The NHTSA procedure provides measuring head excursion at four locations after side impacts of the vehicle at 9.9 and 12.4 kilometers per hour.

DETAILED DESCRIPTION

With reference to the Figures, wherein like numerals indicate like parts throughout the several views, a vehicle 30 has a restraint system 32 that includes a side air curtain 34, a sail panel 36, and a secondary cushion 38. The side air curtain 34 is inflatable to an inflated position and has a top edge 40, a bottom edge 42, and a forward edge 44 extending from the top edge 40 to the bottom edge 42. The sail panel 36 extends from the forward edge 44. The secondary cushion 38 is inflatable to an inflated position and is elongated in a direction D away from the bottom edge 42 and the forward edge 44 toward the top edge 40.

The secondary cushion 38 may provide additional cushioning, reducing a likelihood of injury to an occupant. The secondary cushion 38 may space the side air curtain 34 farther from a window opening 60 and may reinforce the side air curtain 34 at edges of the window opening 60. The spacing and reinforcement of the side air curtain 34 may reduce a likelihood that a head of the occupant intrudes through the window opening 60. Further, in the event that the head of the occupant first makes contact with a front airbag (not shown), the spacing and reinforcement of the side air curtain 34 may prevent the head from sliding off the front airbag.

Figure 1:
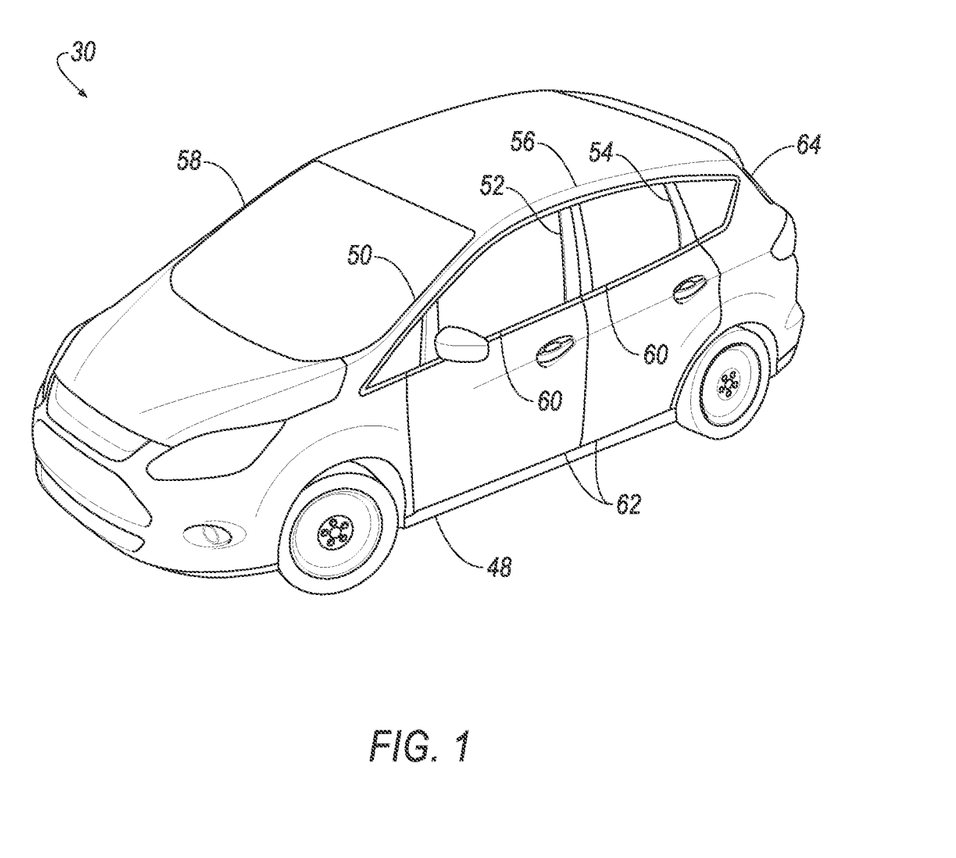
FIG. 1 is a perspective view of a vehicle.
Figure 2:
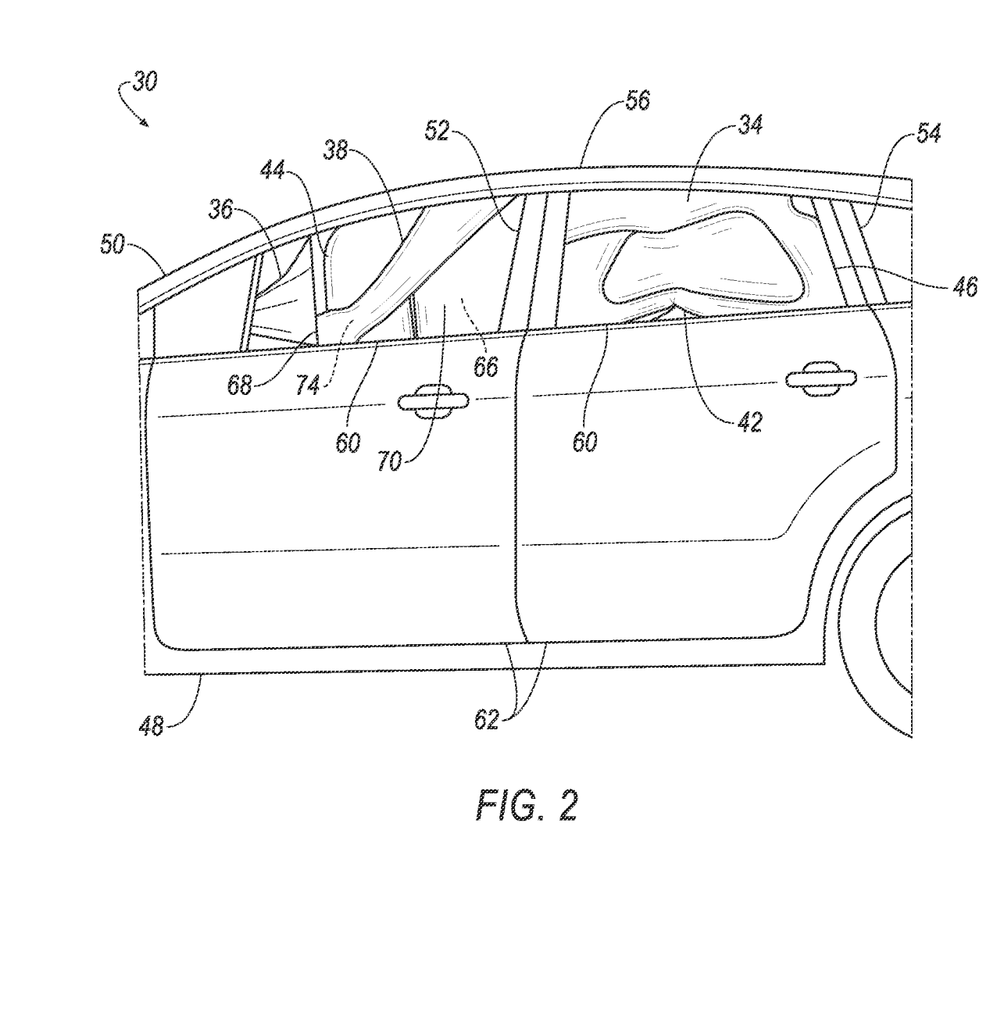
FIG. 2 is a side view of a portion of the vehicle with a side air curtain and secondary cushion inflated.
Figure 3:
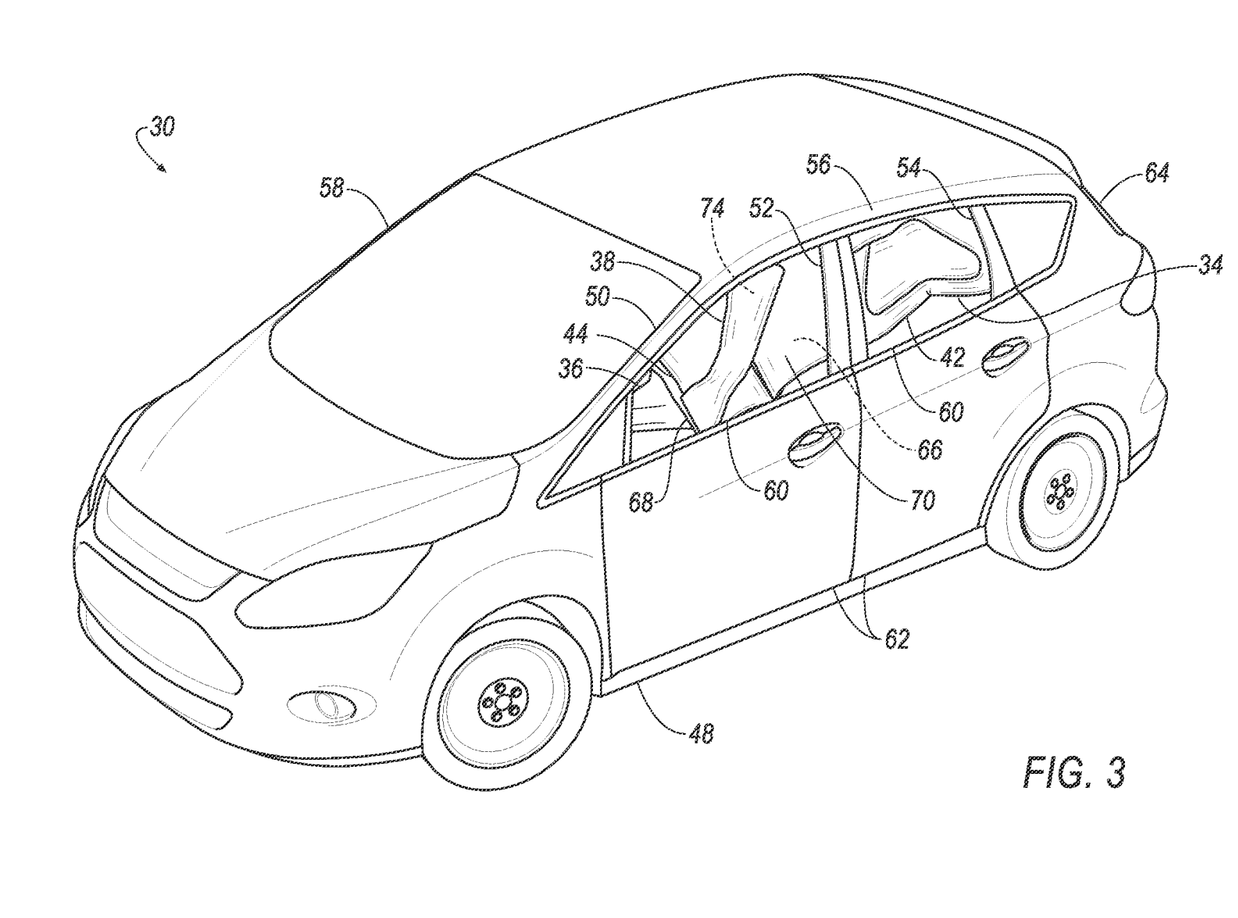
FIG. 3 is a perspective view of a portion of the vehicle with the side air curtain and the secondary cushion inflated.

With reference to FIG. 1, a body 48 of the vehicle 30 may include A pillars 50, B pillars 52, C pillars 54, and upper rails 56. The vehicle 30 may include doors 62. The A pillars 50 may extend between a windshield 58 and window openings 60 of front doors 62. The B pillars 52 may extend between the window openings 60 of adjacent doors 62. The C pillars 54 may extend between the windows and a backlite 64. The body 48 may also include D pillars (not shown) if the vehicle 30 is, e.g., an SUV, crossover, minivan, or station wagon, in which case the C pillars 54 extend between the window openings 60 of rear doors 62 and rear left and right windows (not shown), and the D pillars extend between the rear right and left windows and the backlite 64. The upper rails 56 extend along the windows from the A pillar 50 to the B pillar 52 to the C pillar 54 and possibly to the D pillar.

With reference to FIGS. 2-4B, the side air curtain 34 is inflatable from an uninflated position to an inflated position. The side air curtain 34 has an inflation chamber 66 for receiving inflation medium. The inflation chamber 66 is defined by panels (not numbered).

The side air curtain 34 has the top edge 40, the bottom edge 42, the forward edge 44, and a rear edge 46. The forward edge 44 and the rear edge 46 may extend from the top edge 40 to the bottom edge 42. The forward edge 44 and the bottom edge 42 may meet at a corner 68. The side air curtain 34 may have an outboard side 70 and an inboard side 72 extending from the top edge 40 to the bottom edge 42 and from the forward edge 44 to the rear edge 46. The outboard side 70 is nearer the nearest window opening 60 than the inboard side 72. The outboard side 70 faces the window opening 60, and the inboard side 72 faces an occupant. The side air curtain 34 in the inflated position may be shaped to cover the vehicle window opening 60. The side air curtain 34 may further be shaped to cover two window openings 60.

The side air curtain 34 is supported by the upper rail 56. Specifically, the top edge 40 of the side air curtain 34 in the inflated position is adjacent the upper rail 56, that is, nothing is between the top edge 40 of the side air curtain 34 and the upper rail 56. The side air curtain 34 in the inflated position extends along the window openings 60. The side air curtain 34 in the inflated position extends between the window openings 60 and an occupant of respective seats (not shown) nearest the respective window openings 60.

The side air curtain 34 may be formed of any suitable airbag material, for example, a woven polymer. For example, the side air curtain 34 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

With continued reference to FIGS. 2-4B, the sail panel 36 may extend from the forward edge 44 of the side air curtain 34 to the upper rail 56 or to the A pillar 50. Specifically, the sail panel 36 may extend from the corner 68 to the upper rail 56 or to the A pillar 50. The sail panel 36 may be noninflatable and have a sheetlike shape. The sail panel 36 may be formed of the same material as the side air curtain 34.

The secondary cushion 38 is inflatable from an uninflated position to an inflated position. The secondary cushion 38 has an inflation chamber 74 for receiving inflation medium. The inflation chamber 74 is defined by panels.

The secondary cushion 38 is connected to and elongated along the side air curtain 34. Specifically, the secondary cushion 38 is elongated in a direction D away from the bottom edge 42 and the forward edge 44 toward the top edge 40 of the side air curtain 34. The secondary cushion 38 may extend from the corner 68 to the top edge 40 of the side air curtain 34. The secondary cushion 38 may extend along the outboard side 70 of the side air curtain 34.

With reference to FIGS. 4B-7, the inflation chamber 74 of the secondary cushion 38 and the inflation chamber 66 of the side air curtain 34 may be fluidly isolated from each other, that is, no path for inflation medium extends from the side air curtain 34 to the secondary cushion 38 or vice versa.

Figure 4A:
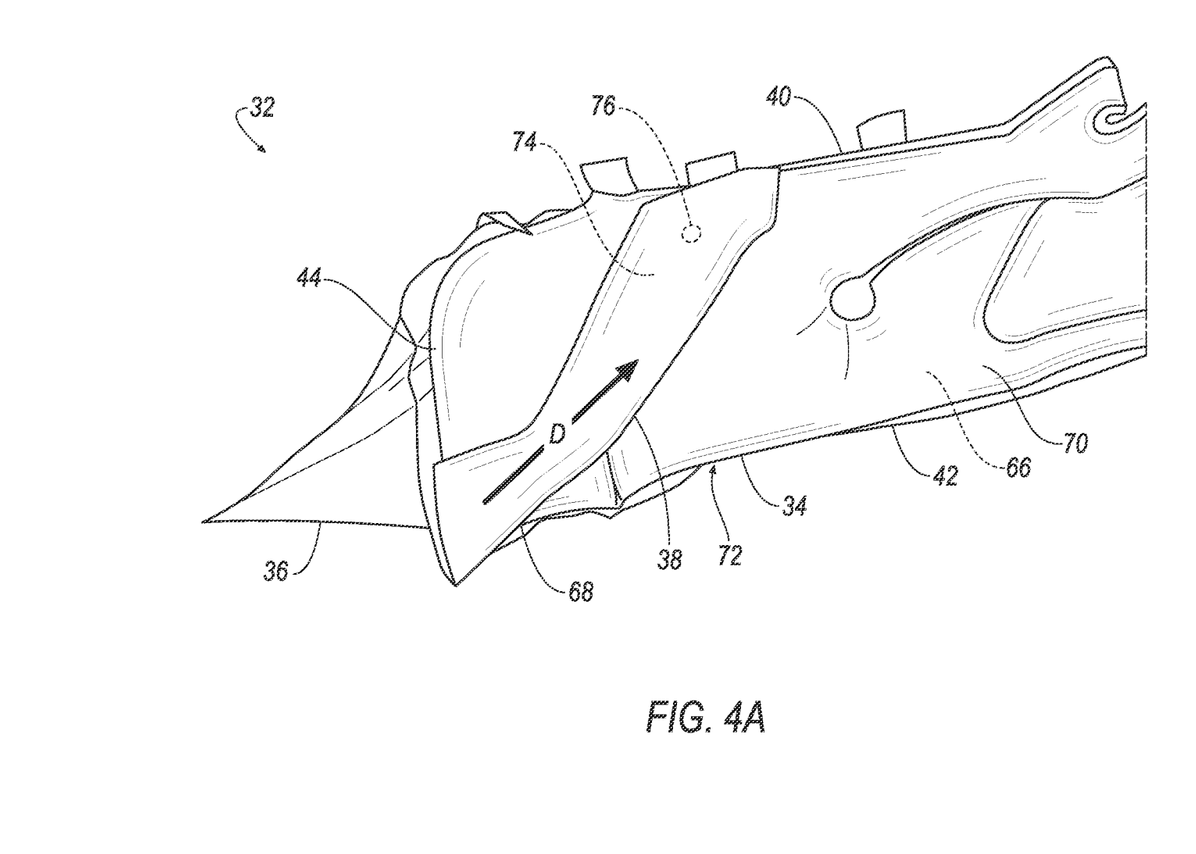
FIG. 4A is a side view of a portion of the side air curtain and the secondary cushion.
Figure 4B:
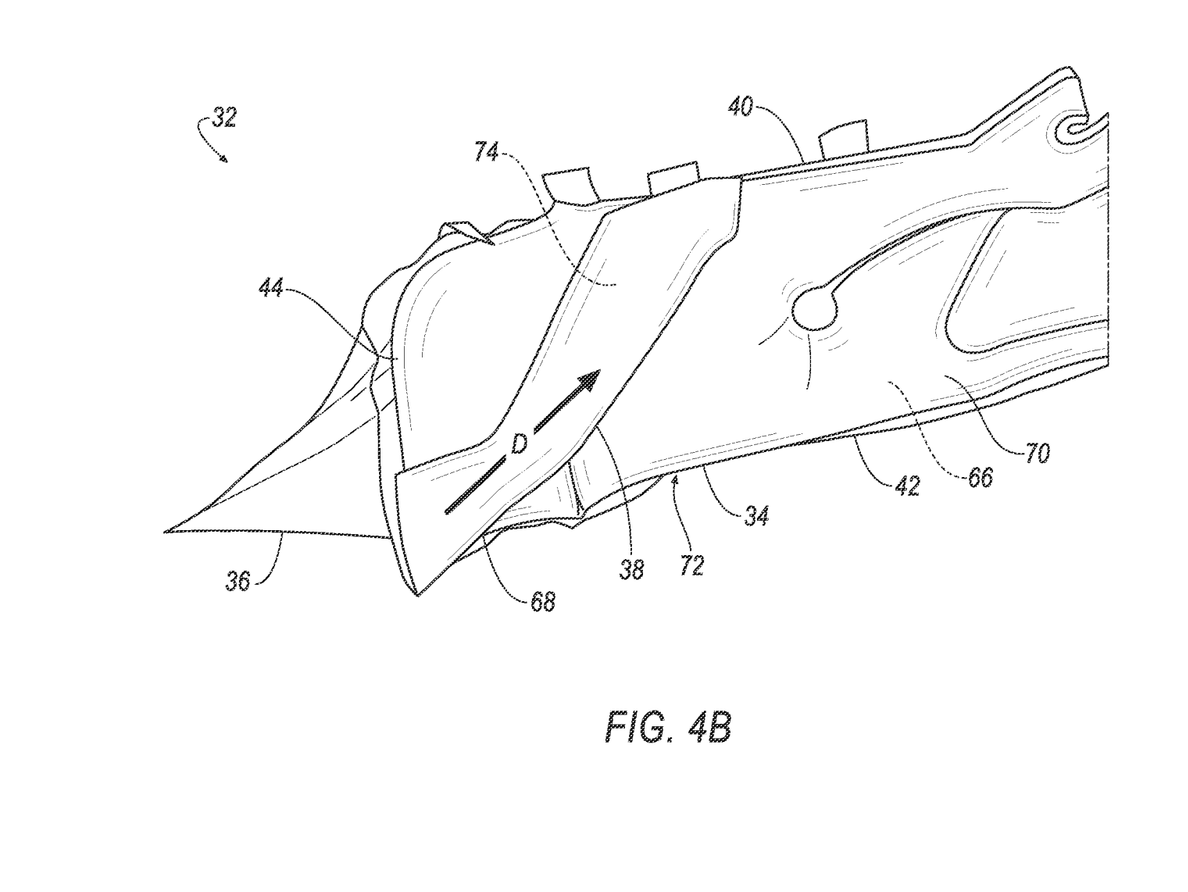
FIG. 4B is a side view of a portion of another embodiment of the side air curtain and the secondary cushion.
Figure 8:
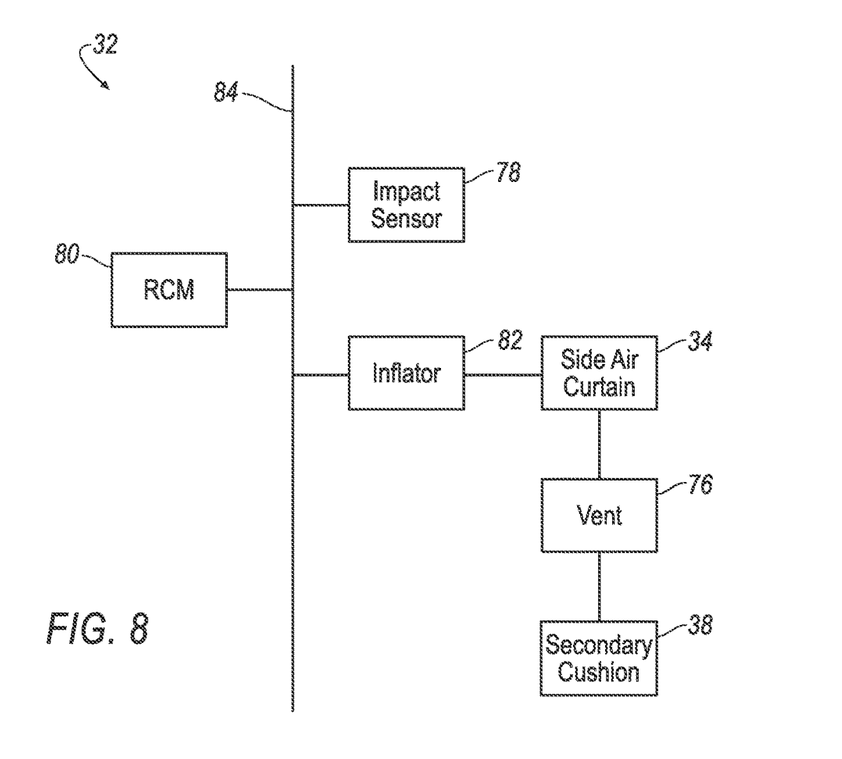
FIG. 8 is a block diagram of another embodiment of the restraint system including the side air curtain and the secondary cushion.

Alternatively, with reference to FIGS. 4A and 8, a vent 76 may pass from the side air curtain 34 to the secondary cushion 38. The vent 76 may be, for example, an open vent, a one-way vent, a two-way vent, or an active vent. The vent 76 may be configured to open after the side air curtain 34 is in the inflated position. For example, the vent 76 may remain closed if an air pressure in the inflation chamber 66 of the side air curtain 34 is below a threshold level and may open if the air pressure in the inflation chamber 66 exceeds a threshold level. The vent may have a flap over a hole (not shown), in which the flap resists being pushed through the hole up to the threshold level of air pressure. The vent may be closed with a tether (not shown) having a tensile strength corresponding to the threshold level of air pressure such that a higher air pressure snaps the tether.

Figure 4C:
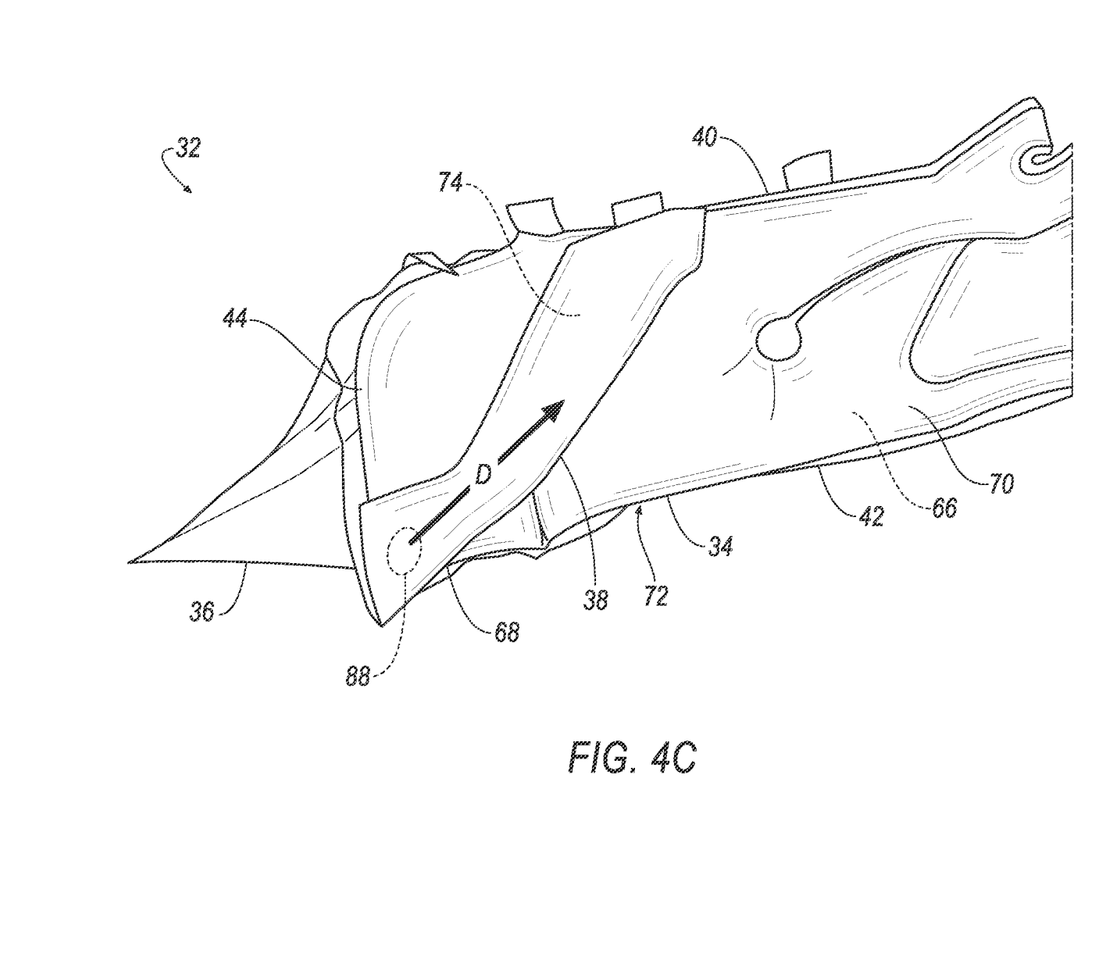
FIG. 4C is a side view of a portion of another embodiment of the side air curtain and the secondary cushion.
Figure 9:
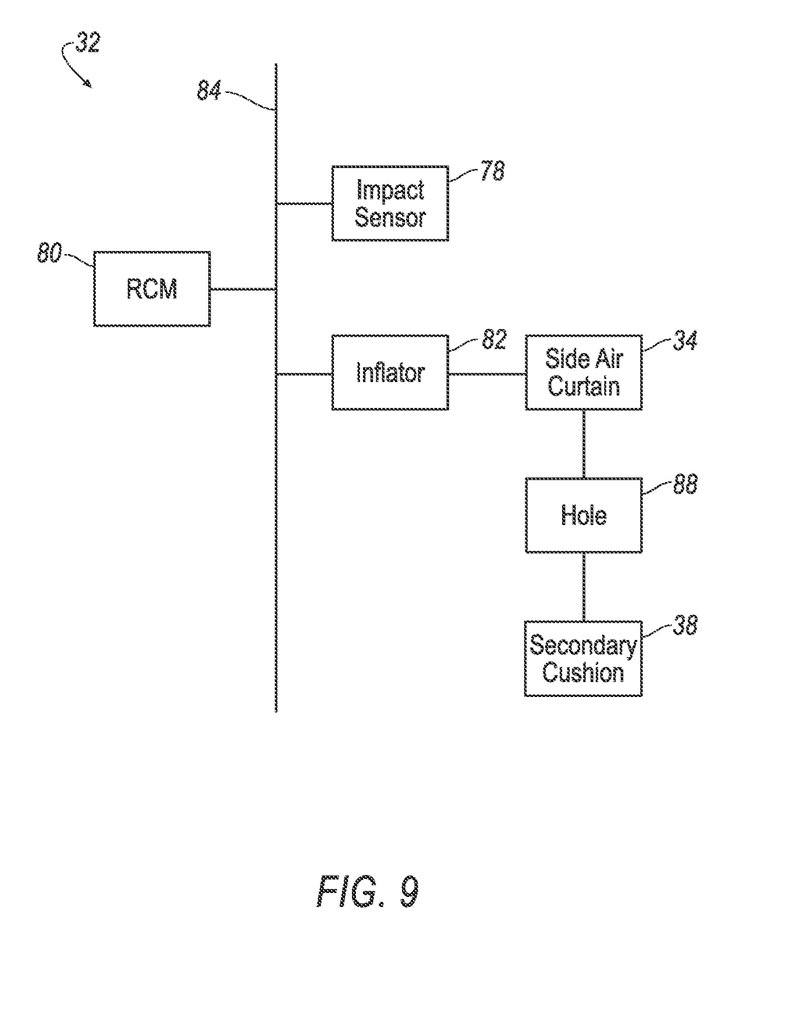
FIG. 9 is a block diagram of another embodiment of the restraint system including the side air curtain and the secondary cushion.

Further alternatively, with reference to FIGS. 4C and 9, a hole 88 may pass from the side air curtain 34 to the secondary cushion 38. The hole 88 may be disposed near the bottom edge 42 of the side air curtain 34. Specifically, the hole 88 may be disposed closer to the bottom edge 42 than to the top edge 40. For example, the hole 88 may be at least five times as far from the top edge 40 than from the bottom edge 42. The hole 88 may be a vent or may be an unobstructed opening between the inflation chamber 66 of the side air curtain 34 and the inflation chamber 74 of the secondary cushion 38. When inflation medium is directed into the side air curtain 34, the side air curtain 34 must at least partially inflate before the hole 88 is exposed to the inflation medium, allowing inflation medium to pass through to the secondary cushion 38.

With reference to FIGS. 5-8, the restraint system 32 may include an impact sensor 78, a control module 80, and an inflator 82. The restraint system 32 may transmit signals through a communications network 84 such as a controller area network (CAN) bus, Ethernet, Local Interconnect Network (LIN), and/or by any other wired or wireless communications network.

The impact sensor 78 may be in communication with the control module 80. The impact sensor 78 is adapted to detect an impact to the vehicle 30. The impact sensor 78 may be of any suitable type, for example, post-contact sensors such as linear or angular accelerometers, gyroscopes, pressure sensors, and contact switches; and pre-impact sensors such as radar, lidar, and vision-sensing systems. The vision systems may include one or more cameras, CCD image sensors, CMOS image sensors, etc. The impact sensor 78 may be located at numerous points in or on the vehicle 30.

The control module 80 is a microprocessor-based controller. The control module 80 may include a processor, memory, etc. The memory of the control module 80 may include memory for storing instructions executable by the processor as well as for electronically storing data and/or databases. The control module 80 may be a restraint control module. The control module 80 may be physically separate from other computing systems in the vehicle 30. The control module 80 may be in communication with and may control the inflator 82 and/or the vent 76, among other functions.

Figure 5:
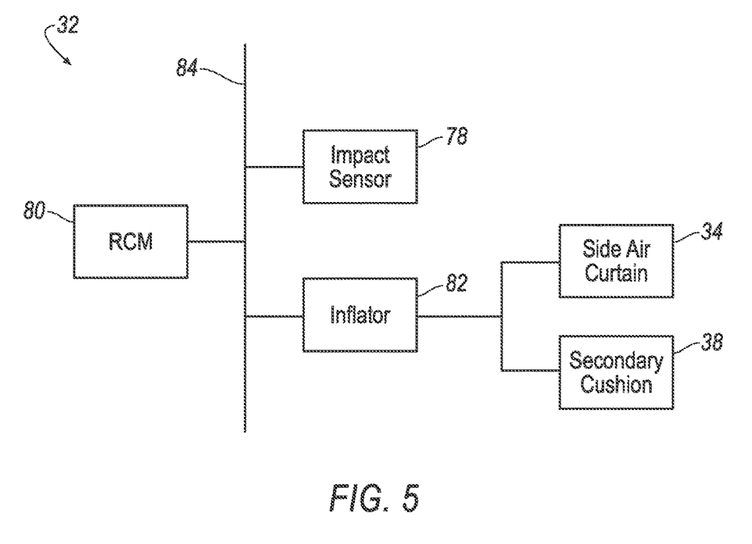
FIG. 5 is a block diagram of a restraint system including the side air curtain and the secondary cushion.

At least one inflator 82 may be in fluid communication with the side air curtain 34 and/or the secondary cushion 38. Specifically, the inflator 82 may be in fluid communication with both the side air curtain 34 and the secondary cushion 38, as shown in FIG. 5, or may be connected to only the side air curtain 34, as shown in FIG. 8. Upon receiving a signal from, e.g., the control module 80, the inflator 82 may inflate the side air curtain 34 and/or the secondary cushion 38 with an inflatable medium, such as a gas. The inflator 82 may be, for example, a pyrotechnic inflator that uses a chemical reaction to drive inflation medium to the airbag. The inflator 82 may be configured to inflate the side air curtain 34 before inflating the secondary cushion 38, either directly or via intermediate components, such as the vent 76 described above or a diffuser 86 described below. The inflator 82 may be of any suitable type, for example, a cold-gas inflator.

With reference to FIG. 5, the at least one inflator 82 may be a dual-stage inflator 82 in fluid communication with the side air curtain 34 and the secondary cushion 38. The dual-stage inflator 82 may be configured to inflate the side air curtain 34 before inflating the secondary cushion 38.

Figure 7:
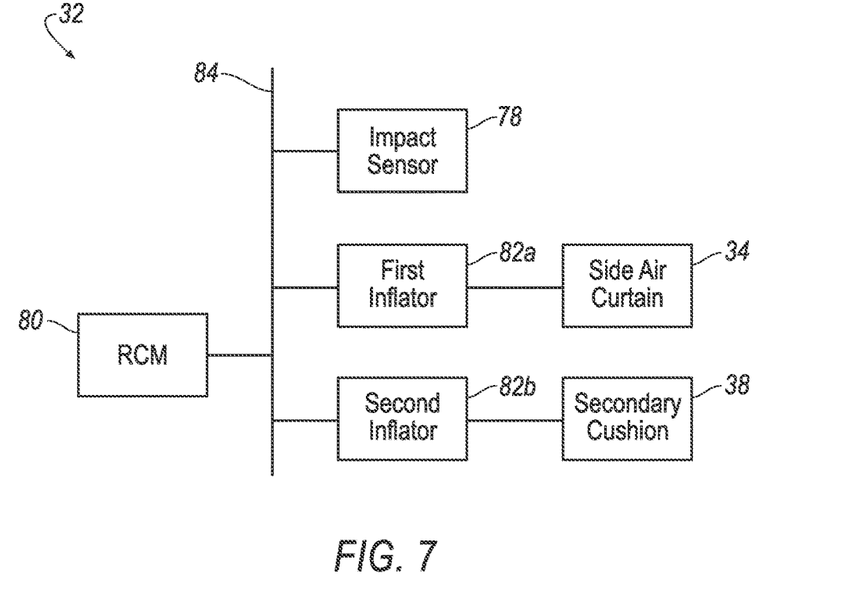
FIG. 7 is a block diagram of another embodiment of the restraint system including the side air curtain and the secondary cushion.

Alternatively, with reference to FIG. 7, the at least one inflator 82 may include a first inflator 82a in fluid communication with the side air curtain 34 and a second inflator 82b in fluid communication with the secondary cushion 38. (The adjectives "first" and "second" are used throughout this document as identifiers and are not intended to signify importance or order.) The first inflator 82a may be configured to initiate inflation of the side air curtain 34 in response to receiving an inflation signal from the control module 80, and the second inflator 82b may be configured to initiate inflation of the secondary cushion 38 in response to the inflation signal after the first inflator 82a has initiated inflation.

Figure 6:
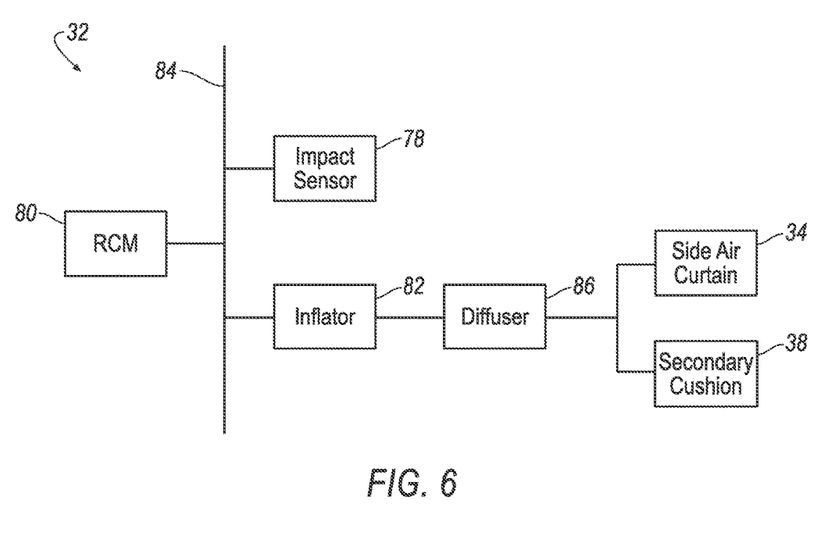
FIG. 6 is a block diagram of another embodiment of the restraint system including the side air curtain and the secondary cushion.

With reference to FIG. 6, the inflator 82 may be in fluid communication with the diffuser 86, and the diffuser 86 may be in fluid communication with the side air curtain 34 and the secondary cushion 38. The diffuser 86 may be configured to direct inflation medium from the inflator 82 so as to inflate the side air curtain 34 before inflating the secondary cushion 38. For example, the diffuser 86 may have a larger total opening leading to the side air curtain 34 than to the secondary cushion 38. Thus, the secondary cushion 38 will inflate faster than the side air curtain 34.

The control module 80 may be programmed to instruct the inflator 82 to initiate inflation of the side air curtain 34 and to initiate inflation of the secondary air cushion only after initiating inflation of the side air curtain 34. For example, in the configuration of FIG. 5, the control module 80 may be programmed to instruct the dual-stage inflator 82 to discharge a first stage of inflation medium into the side air curtain 34 and, after a preset duration, to discharge a second stage of inflation medium into the secondary air cushion. The preset duration may be set by a system designer to, for example, allow the side air curtain 34 to extend substantially a full length of the window opening 60. The preset duration may be, for example, between 20 and 35 milliseconds. For a further example, in the configuration of FIG. 7, the control module 80 may be programmed to instruct the first inflator 82a to discharge inflation medium into the side air curtain 34 and, after the preset duration, instruct the second inflator 82b to discharge inflation medium into the secondary cushion 38. For a yet further example, in the configuration of FIG. 8, the control module 80 may be programmed to instruct the inflator 82 to discharge inflation medium into the side air curtain 34 and, after the preset duration, instruct the vent 76 to open, allowing inflation medium to pass from the side air curtain 34 to the secondary cushion 38.

In the event of an impact, the impact sensor 78 may detect the impact and transmit a signal through the communications network 84 to the control module 80. The control module 80 may send an inflation signal through the communications network 84 according to the programming of the control module 80 described above. The side air curtain 34 inflates from the uninflated position to the inflated position extending along the window opening 60. For the embodiments of FIGS. 5, 7, and 8, after the preset duration, the secondary cushion 38 inflates from the uninflated position to the inflated position, pushing the side air curtain 34 away from the window opening 60 toward an occupant sitting next to the window opening 60. For the embodiments of FIGS. 6 and 9, the secondary cushion 38 inflates more slowly from the uninflated position to the inflated position than the side air curtain 34, pushing the side air curtain 34 away from the window opening 60 toward the occupant sitting next to the window opening 60. The preset duration and/or the slower inflation of the secondary cushion 38 may prevent the side air curtain 34 from being blocked during inflation by an occupant out of position close to the window opening 60. The secondary cushion 38 may provide additional cushioning, reducing a likelihood of injury to the occupant. The secondary cushion 38 may space the side air curtain 34 farther from the window opening 60 and may reinforce the side air curtain 34 at edges of the window opening 60. The spacing and reinforcement of the side air curtain 34 may reduce a likelihood that a head of the occupant intrudes through the window opening 60. Further, in the event that the head of the occupant first makes contact with a front airbag (not shown), the spacing and reinforcement of the side air curtain 34 may prevent the head from sliding off the front airbag.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A restraint system comprising:
   a side air curtain inflatable to an inflated position and having a top edge, a bottom edge, and a forward edge extending from the top edge to the bottom edge;
   a sail panel extending from the forward edge; and
   a secondary cushion inflatable to an inflated position, the secondary cushion being elongated in a direction away from the bottom edge and the forward edge toward the top edge, wherein the secondary cushion in the inflated position extends along an outboard side of the side air curtain.

2. The restraint system of claim 1, further comprising a vent from the side air curtain to the secondary cushion.

3. The restraint system of claim 2, wherein the vent is configured to open after the side air curtain is in the inflated position.

4. The restraint system of claim 1, further comprising a dual-stage inflator in fluid communication with the side air curtain and the secondary cushion.

5. The restraint system of claim 4, wherein the dual-stage inflator is configured to inflate the side air curtain before inflating the secondary cushion.

6. The restraint system of claim 4, wherein the side air curtain and the secondary cushion each have inflation chambers, and the inflation chambers are fluidly isolated from each other.

7. The restraint system of claim 1, further comprising a diffuser in fluid communication with the side air curtain and the secondary cushion, and an inflator in fluid communication with the diffuser.

8. The restraint system of claim 7, wherein the diffuser is configured to direct inflation medium from the inflator so as to inflate the side air curtain before inflating the secondary cushion.

9. The restraint system of claim 1, further comprising a first inflator in fluid communication with the side air curtain, and a second inflator in fluid communication with the secondary cushion.

10. The restraint system of claim 9, wherein the side air curtain and the secondary cushion each have inflation chambers, and the inflation chambers are fluidly isolated from each other.

11. The restraint system of claim 10, the first inflator is configured to initiate inflation of the side air curtain in response to receiving an inflation signal, and the second inflator is configured to initiate inflation of the secondary cushion in response to the inflation signal after the first inflator has initiated inflation.

12. The restraint system of claim 1, further comprising an upper rail, wherein the side air curtain is supported by the upper rail.

13. The restraint system of claim 12, wherein the top edge of the side air curtain in the inflated position is adjacent the upper rail.

14. The restraint system of claim 1, wherein the side air curtain in the inflated position is shaped to cover a vehicle window opening.

15. The restraint system of claim 1, wherein the forward edge and the bottom edge meet at a corner, and wherein the secondary cushion extends from the corner to the top edge.

16. The restraint system of claim 1, further comprising a hole between the side air curtain and the secondary cushion, the hole disposed closer to the bottom edge than to the top edge.

17. A restraint system comprising:
   a side air curtain;
   a secondary cushion connected to and elongated along the side air curtain;
   at least one inflator in fluid communication with the side air curtain and the secondary cushion; and
   a control module programmed to instruct the at least one inflator to initiate inflation of the side air curtain and to initiate inflation of the secondary cushion only after initiating inflation of the side air curtain.

18. The restraint system of claim 17, wherein the at least one inflator includes a first inflator in fluid communication with the side air curtain and a second inflator in fluid communication with the secondary cushion.

19. The restraint system of claim 17, wherein the at least one inflator is a dual-stage inflator.

20. A restraint system comprising:
- a side air curtain inflatable to an inflated position and having a top edge, a bottom edge, and a forward edge extending from the top edge to the bottom edge;
- a sail panel extending from the forward edge;
- a secondary cushion inflatable to an inflated position, the secondary cushion being elongated in a direction away from the bottom edge and the forward edge toward the top edge;
- a diffuser in fluid communication with the side air curtain and the secondary cushion; and
- an inflator in fluid communication with the diffuser;
- wherein the diffuser is configured to direct inflation medium from the inflator so as to inflate the side air curtain before inflating the secondary cushion.

* * * * *